United States Patent Office 3,379,652
Patented Apr. 23, 1968

3,379,652
ARSENOPHOSPHOMOLYBDIC ACID CATALYST
COMPOSITIONS AND PROCESS FOR THEIR
PREPARATION
Howard S. Young, Kingsport, Tenn., assignor to Eastman Kodak Company, Rochester, N.Y., a corporation of New Jersey
No Drawing. Continuation of application Ser. No. 316,543, Oct. 16, 1963. This application Apr. 28, 1967, Ser. No. 634,772
10 Claims. (Cl. 252—437)

This application is a continuation of application Ser. No. 316,543, filed Oct. 16, 1963, now abandoned.

This invention relates to new catalyst compositions and to their manufacture. More particularly the invention relates to new arsenophosphomolybic acid catalyst compositions and to a process for their preparation.

The arsenophosphomolybdic acid catalyst compositions of the invention are valuable catalysts, for example, for the manufacture of acrylonitrile by reaction between propylene, ammonia and molecular oxygen in the vapor phase at an elevated temperature, the manufacture of acrolein and acrylic acid by reaction between propylene and molecular oxygen in the vapor phase at an elevated temperature and the manufacture of methacrolein and methacrylic acid by reaction between isobutylene and molecular oxygen in the vapor phase at an elevated temperature.

The arsenophosphomolybdic acid catalyst compositions of the invention comprise a mixture of an oxide of arsenic and a phosphomolybdic acid.

In accordance with the process of the invention an intimate mixture of a phosphomolybdic acid, such as, for example, dodecamolybdophosphoric acid, and an oxide of arsenic such as arsenous oxide ($As_2O_3$) or arsenic oxide ($As_2O_5$) or mixtures thereof, is prepared and calcined. The calcination can be carried out, for example, by heating the catalyst mixture at a temperature of from about 200° C. to about 600° C., usually for a period of several hours or more. While it is preferred to carry out the calcining operation at a temperature of from about 200° C. to about 600° C., higher or lower temperatures can be employed. The calcined mixture is then reduced to operable granules or particles of any desired size. Preferably the calcining operation is carried out in the presence of air or other suitable oxygen-containing gaseous mixture. However, it can be conducted in the absence of oxygen.

Dodecamolybdophosphoric acid has the empirical formula: $H_3PMo_{12}O_{40}$. The commercially available dodecamolybdophosphoric acid contains about thirty moles of water as hydrate per mole of acid.

The concentration of the dodecamolybdophosphoric acid can vary from 5 to 60% by weight of the catalyst. The concentration of the oxide of arsenic, calculated as $As_2O_5$, can range from 1 to 20% by weight of the catalyst. The catalyst compositions are ordinarily supported on a carrier. The percentages just given are for calcined carrier supported catalyst. Thus, the weight of the catalyst includes the weight of the carrier.

Advantageously, the catalyst compositions are supported on a carrier such as silica or silica gel, alumina, silica-alumina, kieselguhr, pumice, titania, zirconia, magnesia, clay, etc. The catalyst compositions can be readily regenerated by treatment with air or a gas containing molecular oxygen at an elevated temperature. The regeneration can be carried out, for example, at the temperature of the reaction in which the catalyst is employed or at a temperature higher than the reaction temperature.

The use of the catalyst compositions of the invention to prepare acrolein and acrylic acid by reaction between propylene and molecular oxygen in the vapor phase at an elevated temperature of from about 300° C. to about 600° C., preferably from 350° C.–550° C., or methacrolein and methyacrylic acid by reaction between isobutylene and molecular oxygen in the vapor phase at an elevated temperature of from about 300° C. to about 600° C., preferably from 350° C–550° C. is described and claimed in copending Young and McDaniel application Ser. No. 316,523, filed Oct. 16, 1963, now abandoned.

The use of the catalyst compositions of the invention to prepare acrylonitrile by reaction between propylene, ammonia and molecular oxygen in the vapor phase at an elevated temperature is described and claimed in copending Young and McDaniel application Ser. No. 509,459, filed Sept. 30, 1965, now U.S. Patent No. 3,287,394, as a division of Young and McDaniel application Ser. No. 364,834 filed May 4, 1964, now U.S. Patent No. 3,321,411.

Any of the conventional types of apparatus suitable for preparing acrylonitrile by reaction between propylene, ammonia and molecular oxygen in the vapor phase at an elevated temperature or for preparing acrolein and acrylic acid from propylene and molecular oxygen in the vapor phase at an elevated temperature or for preparing methacrolein and methacrylic acid from isobutylene and molecular oxygen in the vapor phase at elevated temperature can be employed in conjunction with the new catalyst compositions of the invention. For example, a tubular type of fluidized or fixed bed reactor or furnace which can be operated in continuous or intermittent manner and which is equipped to contain the catalyst in intimate contact with the entering feed gases can be employed. The effluent gases are then conducted to suitable condensing and separatory equipment for recovering the desired reaction products.

The definitions of certain terms used in the examples are as follows:

Contact time is the average time in seconds which the reactants spend at reaction conditions in a volume equal to that of the catalyst bed.

The percent conversion of propylene to acrolein=

$$\frac{\text{moles of acrolein formed}}{\text{moles of propylene fed}} \times 100$$

The percent yield of acrolein=

$$\frac{\text{moles of acrolein formed}}{\text{moles of propylene consumed}} \times 100$$

The percent conversion of propylene to organic acids=

$$\frac{\text{moles of organic acids formed}}{\text{moles of propylene fed}} \times 100$$

The percent conversion to acrylonitrile may be based on propylene or on ammonia. Based on propylene, percent conversion=

$$\frac{\text{moles acrylonitrile formed}}{\text{moles propylene fed}} \times 100$$

Based on ammonia, percent conversion=

$$\frac{\text{moles acrylonitrile formed}}{\text{moles ammonia fed}} \times 100$$

The yield may be calculated based on propylene or ammonia. Based on propylene, percent yield=

$$\frac{\text{moles acrylonitrile formed}}{\text{moles propylene consumed}} \times 100$$

Based on ammonia, percent yield=

$$\frac{\text{moles acrylonitrile formed}}{\text{moles ammonia consumed}} \times 100$$

Gaseous hourly space velocity (GHSV) is defined as the number of volumes of feed gases at standard temperature and pressure (STP) which pass through one volume of catalyst bed in one hour.

This invention is further illustrated by the following examples of preferred embodiments thereof although it will be understood that these examples are included primarily for purposes of illustration and are not intended to limit the scope of the invention unless otherwise specifically indicated:

Example 1

A catalyst comprising 2.7% arsenic oxide and 42.8% dodecamolybdophosphoric acid on silica was prepared by adding a solution of 252 g. dodecamolybdophosphoric acid hydrate in 150 ml. of water to 825 g. of ammonia-stabilized silica sol (30% silica), followed by the addition of a solution of 12.2 g. of arsenic oxide in 100 ml. water. The preparation was heated with mechanical stirring until it thickened to a yellow slurry. It was dried on a steam bath and then calcined at 200° C. for four hours.

The catalyst was pulverized, sieved, and 200 ml. of 40 x 100 mesh catalyst material was charged to a reactor. A stream of 214 ml. propylene, 1071 ml. air, and 214 ml. water vapor per minute, STP, was charged to the reactor. Reaction temperature was 475° C., with a contact time of 2.9 seconds. Over a period of 30 minutes, 1.0 g. of acrolein was recovered, corresponding to a conversion of 6.4%, with a yield of 11.6%. Some acrylic acid was also formed during the reaction.

Example 2

A cut was made over the same catalyst in which no water was charged to the reactor. The water vapor of the preceding example was replaced with an equal volume of nitrogen, so that the other conditions remained the same. Over 30 minutes of operation, 1.1 g. of acrolein was obtained, corresponding to a conversion to acrolein of 6.6%, with the yield 10.0%. Some acrylic acid was also formed during the reaction.

Example 3

A catalyst comprising 5.2% arsenic oxide and 41.6% dodecamolybdophosphoric acid on silica was prepared as described hereinafter. 252 g. of dodecamolybdophosphoric acid hydrate was dissolved in 150 ml. of water and concentrated nitric acid was added until the green colored solution turned to yellow. The solution just prepared was added to 825 g. of ammonia-stabilized silica sol (30% silica) and the resulting solution was heated nearly to boiling and then a solution of 24.5 g. of arsenic oxide dissolved in water was added. A yellow sol was obtained, dried, and then calcined at 200° C. overnight in a muffle furnace.

The catalyst was broken into small particles, sieved and 200 ml. of 40 x 100 mesh catalyst material was charged to a reactor. When tested at the same conditions as in Example 1, with the single exception that the reaction temperature was 500° C., over 30 minutes of operation 2.2 g. of acrolein was obtained. This corresponds to a conversion of 13.8%, with a yield of 20.7%. Some acrylic acid was also formed during the reaction.

Example 4

A catalyst comprising 5.2% arsenic oxide and 41.6% dodecamolybdophosphoric acid on silica was prepared as described hereinafter. To 825 g. of ammonia-stabilized 30% silica sol was added a solution containing 252 g. of dodecamolylbdophosphoric acid (hydrated), 150 ml. of distilled water and 16 ml. of concentrated nitric acid. Then 24.4 g. of arsenic oxide in 150 ml. of water was added to the sol, and the preparation was heated and stirred on a hot plate until the sol had thickened. It was dried overnight in an oven at 125° C., and then calcined in a muffle furnace for 24 hours at 250° C. and 1.5 hours at 450° C. After cooling, the catalyst was crushed, sieved, and 150 ml. of 80 x 200 mesh catalyst material was charged to a laboratory Vycor-glass, fluid bed reactor.

To the reactor was fed a stream of 152 ml. of propylene and 925 ml. of air per minute at STP. Reaction temperature was 428° C., and the contact time was 2.2 seconds. Over 33 minutes of reaction 1.46 g. of acrolein was obtained, corresponding to a conversion to acrolein of 11.6% with 24.2% yield. Other products included a small amount of acetaldehyde, CO, $CO_2$, and organic acids. The total conversion to organic acids was 26.8%, with acrylic acid the major component.

Example 5

A catalyst comprising 5.2% arsenic oxide and 41.6% dodecamolybdophosphoric acid on silica was prepared as described in Example 4. The resulting catalyst was ground, sieved, and 145 ml. of the catalyst of 80 x 200 mesh was charged to a fluid bed reactor.

A feed stream comprising 127 ml. of propylene and 952 ml. of air per minute, STP, was fed to the reactor. The reaction temperature was 428° C., with 3.14 seconds contact time. After 39 minutes of reaction, the product contained 1.65 g. of acrylic acid, 0.26 g. of acetic acid, and 1.11 g. of acrolein. The conversion to acrylic acid was 10.4%, at 24.1% yield. The conversion to acetic acid was 2.0%. The conversion to acrolein was 9.0%, at 20.8% yield.

Example 6

The catalyst (145 ml. of 80 x 200 mesh) of Example 4 was tested at 445° C. and 2.16 seconds contact time. The feed comprised 180 ml. of propylene and 1351 ml. of air per minute, STP. After 28 minutes of operation, the product contained 2.1 g. of acrylic acid, 0.5 g. of acetic acid, and 0.98 g. of acrolein. The conversion to acrylic acid was 12.9% at 27.5% yield. The conversion to acetic acid was 3.6%. The conversion to acrolein was 7.7% at 16.5% yield.

Example 7

The catalyst (145 ml. of 80 x 200 mesh) of Example 4 was tested at 445° C. and 3.31 seconds contact time. The feed comprised 118 ml. of propylene and 882 ml. of air per minute, STP. After 43 minutes of operation, the product contained 2.2 g. of acrylic acid, 0.48 g. of acetic acid, and 1.15 g. of acrolein. The conversion to acrylic acid was 13.6%, at 22.7% yield. The conversion to acetic acid was 5.8%. The conversion to acrolein was 8.9%, at 14.9% yield.

Example 8

10 milliters of a catalyst comprising 5.2% arsenic oxide and 41.6% dodecamolybdophosphoric acid on silica prepared as described in Example 4 and in the form of small granules was charged to a fixed bed microcatalytic reactor system. The system was connected to a gas chromatograph with appropriate gas sampling valves. This arrangement permitted continuous operation of the reactor with sampling of the effluent from the reactor and quantitative analysis of the product stream as desired. The feed stream contained isobutylene instead of the propylene of the preceding examples. The results obtained are shown in Table 1. In addition to methacrolein, methacrylic acid and acetic acid, traces of acrolein and acrylic acid were also obtained.

TABLE 1.—ISOBUTYLENE OXIDATION

| Temp., °C. | Contact Time, sec. | $C_4H_8:O_2:H_2O:N_2$ Mole Ratios | Methacrolein Convn., Percent | Methacrolein Yield, Percent | Methacrylic Acid Convn., Percent | Methacrylic Acid Yield, Percent | Acetic Acid Convn., Percent | Acetic Acid Yield, Percent |
|---|---|---|---|---|---|---|---|---|
| 475 | 2.1 | 1:1.5:0:6 | 10.0 | 17.0 | 1.3 | 2.3 | 2.5 | 4.2 |
| 475 | 2.1 | 1:1.5:3:6 | 10.7 | 20.2 | 1.4 | 2.7 | 5.0 | 9.4 |
| 450 | 2.1 | 1:1.5:3:6 | 7.7 | 17.9 | 1.8 | 4.2 | 4.1 | 9.6 |
| 375 | 2.2 | 1:1.5:0:6 | 5.1 | 12.5 | 1.1 | 2.6 | 2.3 | 5.6 |

The results obtained when the catalyst compositions of the invention were used to prepare acrylonitrile from propylene, oxygen and ammonia are set forth in Table 2. In the table, ACN stands for acrylonitrile, and MeCN stands for acetonitrile. The catalyst employed in Examples 9 to 14 inclusive, comprised 5.2% $As_2O_5$ and 41.6% $H_3PMo_{12}O_{40}$ prepared as described in Example 3. 200 ml. of 40 x 100 mesh catalyst material was employed in Examples 9 to 14, inclusive.

The catalyst employed in Examples 15 to 22 inclusive, comprised 2.7% $As_2O_5$ and 42.8% $H_3PMo_{12}O_{40}$ prepared as described in Example 1. 200 ml. of 40 x 100 mesh catalyst material was employed in Examples 15 to 22, inclusive.

TABLE 2.—CATALYTIC SYNTHESIS OF ACRYLONITRILE FROM PROPYLENE, OXYGEN AND AMMONIA

| Example No. | Temp., °C. | Mole Ratios, $C_3H_6:O_2:NH_3:H_2O:N_2$ | GHSV, S.T.P. | Convn. to ACN, on $C_3H_6$ | Convn. to ACN, on $NH_3$ | Yield of ACN, on $C_3H_6$ | Yield of ACN, on $NH_3$ | Convn. to MeCN, on $C_3H_6$ | Yield of MeCN, on $C_3H_6$ |
|---|---|---|---|---|---|---|---|---|---|
| 9 | 495 | 1:1.5:1:1:6 | 630 | 35.8 | 35.8 | 54.2 | 35.8 | 4.6 | 7.0 |
| 10 | 495 | 1:1.5:1:1:6 | 630 | 35.8 | 35.8 | 50.5 | 35.8 | 6.3 | 8.9 |
| 11 | 495 | 1:1.5:1:1:6 | 720 | 38.7 | 38.7 | 57.9 | 38.7 | 7.7 | 11.5 |
| 12 | 495 | 1:1.5:1:1:6 | 900 | 34.8 | 34.8 | 55.8 | 35.6 | 6.4 | 10.3 |
| 13 | 495 | 1:2:1.25:1:8 | 720 | 33.7 | 26.8 | 50.6 | 26.8 | 8.7 | 13.1 |
| 14 | 495 | a 1:1.5:1:0:7 | 630 | 35.0 | 35.0 | 51.9 | 35.0 | 6.5 | 9.6 |
| 15 | 495 | 1:1.5:1:1:6 | 630 | 33.2 | 33.2 | 49.1 | 33.2 | 8.2 | 12.0 |
| 16 | 495 | 1:1.5:1:1:6 | 630 | 36.0 | 36.0 | 55.9 | 36.0 | 9.7 | 14.8 |
| 17 | 495 | 1:1.5:1:1:6 | 720 | 36.7 | 36.7 | 53.5 | 36.7 | 8.5 | 12.4 |
| 18 | 490 | 1:1.5:1:1:6 | 540 | 37.8 | 37.8 | 49.8 | 37.8 | 9.8 | 12.9 |
| 19 | 485 | 1:2:1.25:1:8 | 630 | 30.0 | 24.2 | 38.7 | 25.4 | 7.8 | 10.0 |
| 20 | 465 | 1:1.5:1:1:6 | 540 | 25.0 | 25.0 | 33.5 | 27.8 | 13.8 | 18.5 |
| 21 | 455 | 1:2:1.25:1:8 | 630 | 19.3 | 15.5 | 26.9 | 18.5 | 13.8 | 19.3 |
| 22 | 465 | a 1:1.5:1:0:7 | 540 | 28.4 | 28.4 | 39.2 | 30.9 | 14.7 | 20.3 | a No water was fed in this example.

The calcining operations described herein were carried out in the presence of air.

The catalyst compositions of the invention have been illustrated with reference to certain representative catalyst compositions. However, other catalyst compositions falling within the range of my catalyst compositions specified herein give generally similar results. While the oxide of arsenic employed in the catalyst compositions specifically disclosed is arsenic oxide an equivalent amount of arsenous oxide can be used in place of arsenic oxide. Both arsenic oxide and arsenous oxide appear to work equally well in the catalyst compositions of the invention.

The invention has been described in detail with particular reference to preferred embodiments thereof, but it will be understood that variations and modifications can be effected within the spirit and scope of the invention as described hereinbefore and as defined in the appended claims.

I claim:

1. A catalytic calcined mixture consisting essentially of (1) 1 to 20 percent by weight of an oxide of arsenic, (2) 5 to 60 percent by weight of a phosphomolybdic acid and (3) a carrier, wherein said oxide of arsenic and said phosphomolybdic acid are supported on said carrier.

2. A catalytic calcined mixture consisting essentially of 1 to 20 percent by weight of arsenic oxide, 5 to 50 percent by weight of a phosphomolybdic acid and a carrier, wherein said arsenic oxide and said phosphomolybdic and are supported on said carrier.

3. A catalytic mixture in accordance with claim 1 wherein the carrier is a silica carrier.

4. A catalytic mixture in accordance with claim 2 wherein the carrier is a silica carrier.

5. A catalytic calcined mixture in accordance with claim 1 consisting essentially of (1) 1 to 20 percent by weight of an oxide of arsenic, (2) 5 to 60 percent by weight of dodecamolybdophosphoric acid, and (3) a carrier as the remainder of the mixture, wherein said oxide of arsenic and said dodecamolybdophosphoric acid are supported on said carrier.

6. A catalytic mixture in accordance with claim 5 wherein said oxide of arsenic is arsenic oxide.

7. A catalytic mixture in accordance with claim 6 wherein the carrier is a silica carrier.

8. A catalytic calcined mixture containing:

| | Percent by weight |
|---|---|
| (A) Arsenic oxide | 5.2 |
| (B) Dodecamolybdophosphoric acid | 41.6 |
| (C) Silica | 53.2 | and wherein said arsenic oxide and said dodecamolybdophosphoric acid are supported on the silica.

9. A process of preparing a catalyst composition which comprises (1) adding an aqueous solution of dodecamolybdophosphoric acid to a silica sol, (2) adding an aqueous solution of arsenic oxide to the aqueous mixture obtained in 1, (3) drying the mixture obtained in 2 and calcining the dried mixture.

10. A process in accordance with claim 9 wherein the calcination is carried out at a temperature of from about 200° C. to about 600° C.

References Cited

UNITED STATES PATENTS

| 2,301,966 | 11/1942 | Michel et al. | 260—683.15 |
| 2,450,675 | 10/1948 | Marisic et al. | 252—437 |
| 2,547,380 | 4/1951 | Fleck | 252—437 |
| 2,798,890 | 7/1951 | Waterman et al. | 260—683.15 |
| 2,881,212 | 4/1959 | Idol et al. | 252—437 |
| 3,190,913 | 6/1965 | Fetterly et al. | 252—435 |

DANIEL E. WYMAN, *Primary Examiner.*

P. E. KONOPKA, *Assistant Examiner.*